United States Patent
Ackley et al.

[11] Patent Number: 5,836,362
[45] Date of Patent: Nov. 17, 1998

[54] MULTIPLE ADSORBENT LOADING METHOD AND APPARATUS FOR A RADIAL FLOW VESSEL

[75] Inventors: Mark William Ackley, East Aurora; Jeffert John Nowobilski, Orchard Park; James Smolarek, Boston; James Stanley Schneider, Akron, all of N.Y.

[73] Assignee: Praxair Technology, Inc., Danbury, Conn.

[21] Appl. No.: 892,888

[22] Filed: Jul. 15, 1997

[51] Int. Cl.[6] .................................................. B65G 65/32
[52] U.S. Cl. ........................... 141/286; 141/9; 141/34; 141/100; 414/301
[58] Field of Search ..................... 141/286, 9, 34, 141/100; 414/301, 302

[56] References Cited

U.S. PATENT DOCUMENTS

| | | | |
|---|---|---|---|
| 3,620,685 | 11/1971 | Rogers | 23/288 R |
| 3,780,887 | 12/1973 | Bottoms | 214/17 |
| 3,972,686 | 8/1976 | Johnson et al. | 23/288 R |
| 4,159,785 | 7/1979 | Berry | 222/63 |
| 4,397,423 | 8/1983 | Beaver et al. | 239/684 |
| 4,541,851 | 9/1985 | Bosquain et al. | 55/208 |
| 4,698,072 | 10/1987 | Rohde et al. | 55/31 |
| 4,972,884 | 11/1990 | Souers et al. | 141/1 |
| 5,232,479 | 8/1993 | Poteau et al. | 55/387 |
| 5,324,159 | 6/1994 | Nowobilski et al. | 414/301 |

Primary Examiner—J. Casimer Jacyna
Assistant Examiner—Kerry S Culpepper
Attorney, Agent, or Firm—Robert J. Follett

[57] ABSTRACT

The invention comprises particle loader assembly for loading particles into a vessel to form a particle bed comprising inner and outer radially disposed concentric layers of particles said inner layer containing at least one type of particle of different granulometry or composition or both granulometry and composition from a type of particle contained in said outer layer.

11 Claims, 5 Drawing Sheets

MULTIPLE ADSORBENT LOADING METHOD AND APPARATUS FOR A RADIAL FLOW VESSEL

FIELD OF THE INVENTION

The invention relates to loading two or more separate layers of adsorbent onto "radial flow" vessels which hold the adsorbents used in plants employing thermal swing (TSA), pressure swing (PSA), vacuum swing (VSA) or vacuum-pressure swing (VPSA) adsorption processes for the separation of components of a fluid, notably oxygen (or nitrogen) from air. More generally, the invention relates to loading any vessel (particularly an adsorption vessel) with two or more distinct radially disposed concentric layers of particles (particularly adsorbent particles) of different composition and/or granulometry.

DESCRIPTION OF THE PRIOR ART

In any adsorption vessel it is often desirable to load different types of adsorbent onto various areas of the adsorbent bed of a vessel to remove or treat different components of a fluid as the fluid passes through the adsorbent. In an axial flow vessel, this involves placing the adsorbents in the vessel in horizontal layers which is easily accomplished. In a radial flow vessel (i.e., in a vessel wherein the fluid to be processed flows through the adsorbent bed while the fluid is flowing in a radial (typically radially inward) direction) this loading becomes difficult because in such a vessel the layers are radially disposed and the interface between layers is oriented parallel with the gravity field.

The prior art has attempted to solve this problem in two ways. The first makes use of partitions which are built into the bed, effectively dividing the adsorbent bed area into multiple separate concentric adsorbent beds which are then individually loaded. This is shown in U.S. Pat. No. 3,620,685 which uses permanently mounted concentric perforated cylinders for retaining each layer of catalyst and U.S. Pat. No. 4,541,851 which uses cylindrical grates for retaining each layer of adsorbent. In each case, considerable structure is added to the vessel, undesirably increasing the cost of the vessel. In addition to the increase in pressure drop, the presence of these partitions can adversely affect contact between fluid and adsorbent, a phenomenon called shadowing in the pertinent art.

In the second method, the radial flow bed is divided into stacked vertical bed sections which are separated by a solid horizontal partition. After the first bed section is loaded with one adsorbent type the partition is installed and then the second section is loaded with another adsorbent type as in U.S. Pat. No. 5,232,479. Alternatively, each section can be loaded individually through separate fill pipes as in U.S. Pat. No. 4,698,072. Each is the equivalent of two single-adsorbent radial-flow beds stacked on top of one another. This not only adds considerable structure to the vessel, but also undesirably increases the bed height which increases the risk of (i) flow maldistribution, (ii) increased pressure drop across the adsorbent bed, and (iii) increased void volume. Any one of the foregoing will adversely affect the operating efficiency of the vessel.

Several types of apparatus for loading vessels with particulate material have been developed, e.g. as described in U.S. Pat. No. 3,972,686 and 4,159,785.

However, such equipment is capable of dispensing only a single type or a single layer of particles and is not adapted for dispensing simultaneously two or more different particle types, much less dispensing multiple adsorbents in distinct radially disposed concentric layers.

U.S. Pat. No. 5,324,159 is also directed to a particle loader for dispensing a single type of particles at any one time. The disclosure of U.S. Pat. No. 5,324,159 is incorporated by reference in its entirety with the proviso that, in case of conflict, the present specification controls.

Accordingly, there is still a need in the art for a convenient and cost-effective solution to the problem of loading vessels (especially large vessels) with two or more distinct, concentric, radially disposed layers of particles. The need is particularly acute for large vessels holding adsorbent particles and especially adsorbent particles employed in separation of oxygen or nitrogen from air in various PSA, VSA or VPSA processes which are particularly sensitive to cost considerations. In such processes there is an ever-present need for reducing capital, and/or operating costs with a view towards lowering overall cost without compromising product quality, notably purity.

Hereafter, reference to VPSA shall be deemed to include reference to PSA or VSA; reference to adsorbents shall include not only adsorbent particles (such as zeolites), but also other types of particles used in radial flow vessels such as catalyst particles or flow distributing non-adsorbent particles.

With respect to VPSA, a "large" vessel is a vessel having a diameter greater than 6 ft. The throughput of a large vessel is at least 60 tons of air per day.

By the term "granulometry" we mean particle properties such as size (preferably up to about 6 mm), shape (e.g. spherical, cylindrical or extruded and/or non-uniform) and/or texture.

"Different adsorbents", "different particle types" or "different particulate materials" shall mean two or more adsorbents or particles (at least one of which can be in the form of an adsorbent or particle mixture) differing from one another in composition or granulometry.

OBJECTS OF THE INVENTION

The invention has as an object to provide an improved method and apparatus for loading a vessel with at least two radially disposed, distinct concentric layers of different particulate materials. Other objects of the invention include one or more of the following:

1) conducting the vessel-filling operation at an adequate speed by simultaneously filling the vessel with both (or with all) adsorbent types and continuing the filling operation substantially without interruption;
2) employing a small number of personnel for conducting and supervising the entire or substantially the entire vessel-filling operation (preferably only one person);
3) dispensing with the need for incorporating in the permanent vessel structure features such as free-standing dividers or partitions designed to keep the particle layers distinct, such features adding to the capital cost of the vessel but being either useless in or harmful to the efficiency of the adsorption operation which the filled vessel is designed to perform;
4) achieving at least a uniform and a high packing density throughout each layer;
5) achieving a clean (vertical) and not a jagged interface between adjacent layers of particles; and
6) achieving a sharp interface, i.e. reducing the radial width of an interface mixing zone containing particles from both adsorbent layers.

SUMMARY OF THE INVENTION

Disclosed is a particle loader and method that simultaneously places adsorbents or other granular or particulate materials of at least two types into distinct concentric layers of particles radially disposed within a vessel. The radial width of each layer and its radial location is predetermined and can be controlled. The different adsorbents are dropped onto their respective sections in the vessel substantially simultaneously and at the same volumetric rate per unit surface area ($ft^3/sec/ft^2$) As a result, the adsorbent bed portion of the vessel fills at a uniform rate and a uniform and high packing density (at least 5–10% higher than that achieved by the aforementioned prior art methods) is achieved throughout. The invention maintains separate concentric layers of the various types of adsorbent and a uniform adsorbent packing density within each layer. The invention eliminates the need for increasing the vessel height to accommodate stacked rather than concentric vertical bed sections, or adding any substantial, permanent, free-standing structure to the vessel. The filling operation proceeds at an industrially acceptable speed, and can be controlled by a single operator. The foregoing result inter alia in one or more of the following advantages: a lower cost vessel, a process with a lower pressure drop, reduced vessel void volumes, uniform and higher packed density of adsorbent, and improved radial flow distribution across the bed.

The apparatus of the invention is provided with a multiple hopper and multi-section feed system for accommodating the various particle types and keeping them in separate particle streams and for directing each adsorbent type to a predetermined section of the vessel where a layer of that particular adsorbent is to be deposited. The invention finds particular applicability to radial flow vessels for the separation of oxygen or nitrogen from air through use of VPSA.

BRIEF DESCRIPTION OF THE DRAWINGS

The invention is described below by reference to the accompanying drawings as follows.

DETAILED DESCRIPTION OF THE PREFERRED EMBODIMENTS

Figure 1:
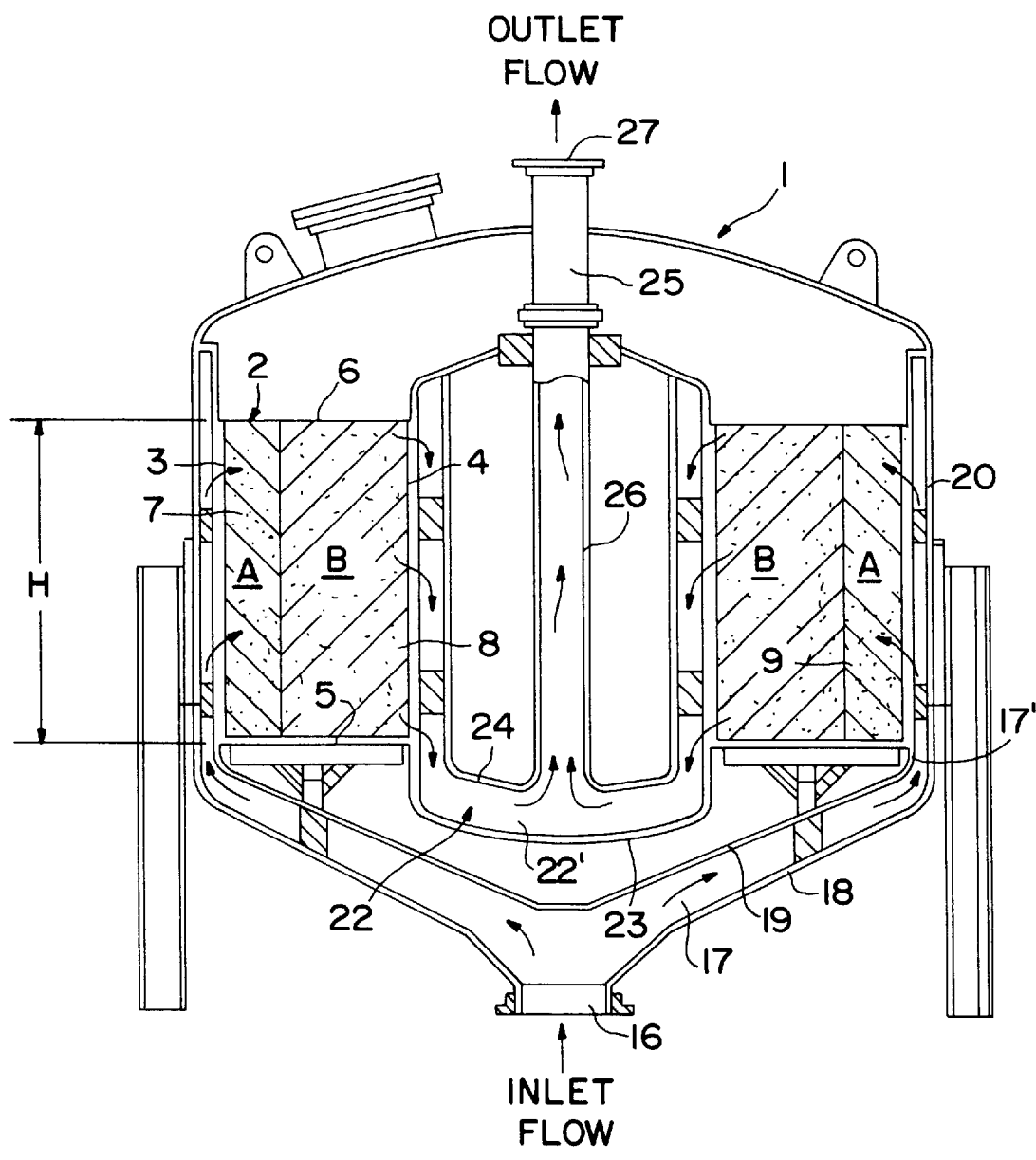
FIG. 1 depicts an axial cross-section of a radial flow vessel comprising an adsorbent bed with two distinct radially disposed concentric adsorbent layers A and B. The bed has been filled using the apparatus and method of the present invention.

Radial flow vessel 1, shown in axial cross-section in FIG. 1, comprises an adsorbent bed section 2 comprising outer side wall 3 and inner side wall 4. Both side walls 3 and 4 are cylindrical and permit flow of the fluid to be processed in the vessel, ensuring a substantially uniform distribution of the fluid throughout the bed. Adsorbent bed base 5 is annular and is not permeable to the fluid, the same being true of adsorbent bed ceiling 6. Adsorbent bed section 2 comprises concentric adsorbent layers 7 and 8. Outer layer 7 is composed of adsorbent A and inner layer 8 is composed of adsorbent B. Both layers have height H between base 5 and the top 6 of the bed. The interface 9 of adsorbents A and B (i.e. the interface of layers 7 and 8) does not comprise any partition or other element of vessel structure in this embodiment.

Ideally, the interface 9 will be just a cylindrical surface as shown in FIG. 1 without appreciable radial width. In practice, however, there may be some mixing of A and B at the interface which will cause the interface 9 to have a radial width (not shown). The present invention also provides a method and apparatus for reducing the radial width of the interface between different adsorbents. Additionally, because of the simultaneous filling of the layers, and the uniform filling rate, the interface will have a straight and not a jagged or herringbone profile. That is the interface will be substantially free of discrete intrusions of one adsorbent layer into the other which would give a jagged or herringbone pattern to the interface with the jags departing from the vertical by 0.25 or 0.5 inch or more.

FIG. 1 also depicts fluid inflow distribution system which comprises fluid inlet 16, radial inflow conduit 17 formed (i) between the vessel outer bottom wall 18 and inflow distribution inverted cone 19 located inside the bottom of the vessel 1 and (ii) between vessel outer side wall 20 and adsorbent bed outer side wall 3 at the level of the adsorbent bed section 2. The vessel fluid outflow system comprises annular cylindrical chamber 22 formed by adsorbent bed section inner cylindrical side wall 4, base 23 and annular cylindrical fluid barrier 24. Chamber 22 receives the radially flowing fluid exiting the adsorbent bed 2 and is connected to conduit 25 formed by the inner cylindrical wall 26 of fluid barrier 24. Conduit 25 is connected to fluid outlet 27.

The fluid to be processed, such as air during the adsorption phase of e.g. a VPSA process, flows into the vessel 1 through inlet 16, then flows radially outwardly and upwards within inflow conduit 17, then flows upward and radially inward within portion 17' of conduit 17 formed by outer wall 20 and bed side wall 3. The fluid then flows radially inward through the adsorbent bed section 2; first through adsorbent A (outer layer 7) and then through adsorbent B (inner layer 8). Product fluid exits through permeable wall 4 and flows downward in conduit 22, radially inward at the bottom 22' thereof and then upward along conduit 25 and out of the vessel through outlet 26.

Figure 2:
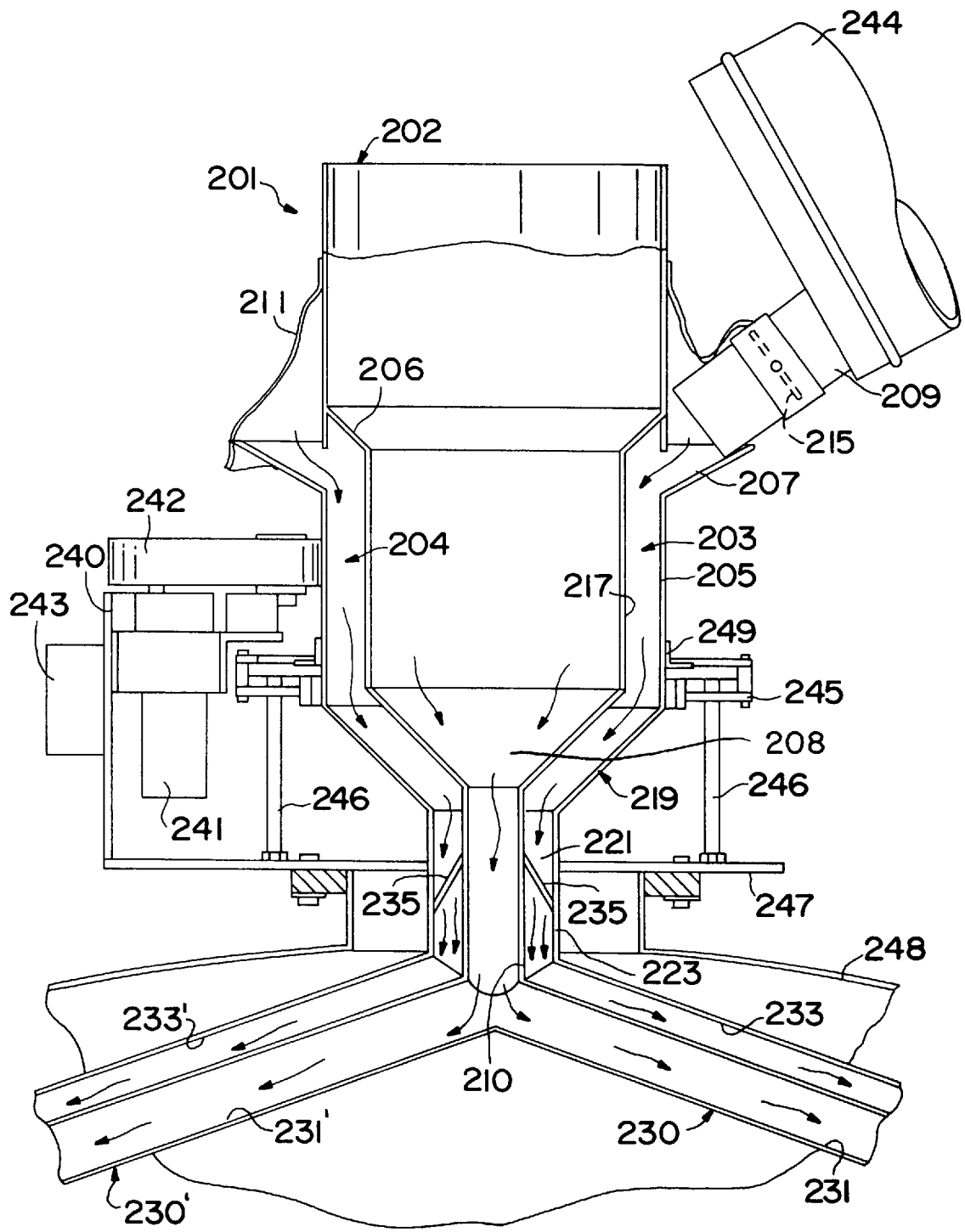
FIG. 2 depicts an axial cross-sectional view of a particle loading apparatus according to the invention, this embodiment having two diametrically opposed rotary arms each arm depositing two different adsorbent layers.

FIG. 2 shows in axial cross section one embodiment of a rotary arm particle loader according to the invention. This embodiment comprises two rotary arms 230 and 230', which is preferred (although a single rotary arm (or even three or more rotary arms) can be used). In FIG. 2, a dual adsorbent loader 201 for a radial flow adsorbent bed (such as the bed of the vessel in FIG. 1) is shown. The loader 201 is rotatably mounted on support and rotation assembly 240. Assembly 240 comprises two L-shaped fixed flanges 245 on upright supports 246, drive belt 242, motor 241 and controller 243. Flanges 245 cooperate with rotating flange 249 secured to hopper 203 to permit rotation of the loader. Supports 246 are mounted to fixed mounting plate 247, also part of assembly 240. Plate 247 is affixed to the upper portion of an adsorption vessel (not shown) through support arms 248. Hopper assembly 202, hopper assembly 203, and rotary arms 230, 230' rotate about the center vertical axis driven by belt 242. Motor 241 drives belt drive 242. The rotation and loading of loader 201 as well as the deposition of adsorbent layers is controlled by controller 243 which controls the rotating speed as well as the flow rate for the adsorbent. Particles are loaded onto loader 201 from drums such as drum 244.

Still with reference to FIG. 2, inner hopper assembly 202 is for loading the inner adsorbent (B in FIG. 1). Outer hopper assembly 203 is for loading the outer adsorbent (A in FIG. 1).

Inner hopper assembly 202 comprises hopper 204 comprising a shelf portion 206 and ending at the bottom with feed cone 208 which is connected to and in particle flow communication with round cross section conduit 210 in turn connected and in particle flow communication with the inner adsorbent chute conduit 231 (and 231') of rotary arm 230 (and 230'). Rotary arm 230 (and 230') extends radially outwardly and slightly downwardly from the center of conduit 210. The distal end 304 of rotary arm 230 (and 230') shown in FIG. 3 reaches to the vicinity of the outer side wall of the adsorbent bed section of the vessel to be loaded (such as wall 3 in FIG. 1) and moves in a rotational pattern around the inner periphery of the vessel's adsorbent bed section.

Figure 3:
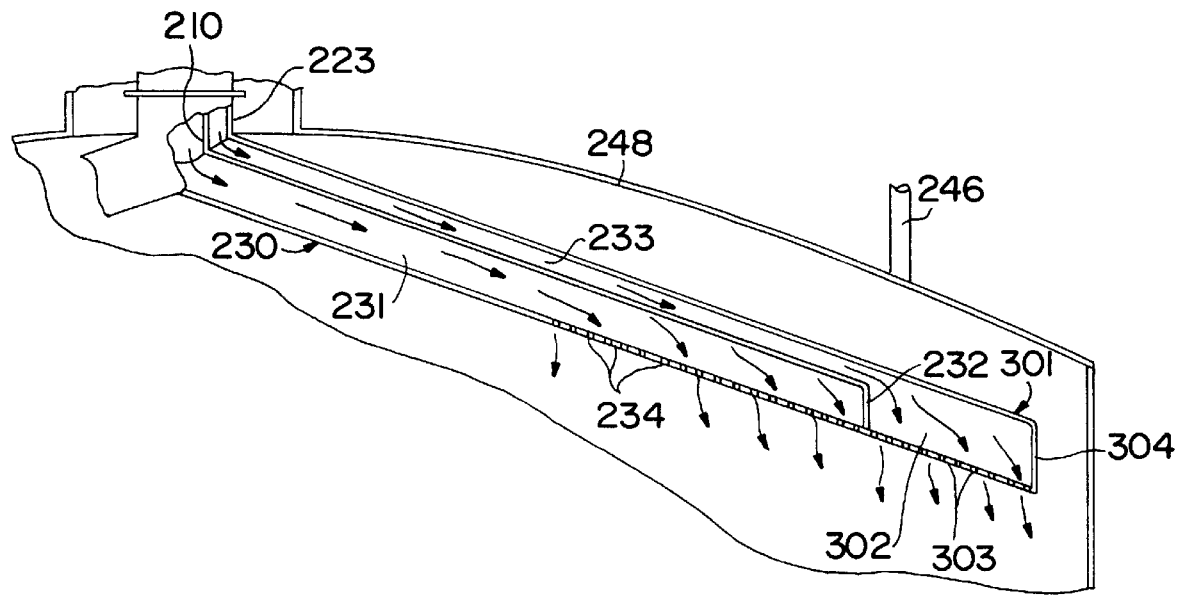
FIG. 3 depicts a detailed axial cross-sectional view of an embodiment of a rotary arm according to the embodiment of FIG. 2.

An enlarged cross-sectional view of rotary arm 230 is shown in FIG. 3. Rotary arm 230 comprises two chute conduits which do not communicate with each other: chute conduit 231 which communicates with round cross section conduit 210 and carries the inner adsorbent to dispense it on the bed, and chute conduit 233 which will be described further below and which carries the outer adsorbent and dispenses it on the bed. In FIG. 2, chute conduits 231 and 233 are shown to be integral with rotary arm 230 but this is optional. They are shown with conduit 233 being on top of conduit 231 but this is also optional. For example, the chute conduit for the outer adsorbent layer could be enclosed by and concentric with the chute conduit for the inner adsorbent layer throughout the length of the latter and extend past its distal end. Alternatively, conduits 231 and 233 could be disposed side-by-side or even spread apart (up to 180°) as in the embodiment of FIG. 5. However, arrangements where there is a dual rotary arm symmetrically disposed about the rotation axis as e.g. in FIG. 2 are preferred.

Further with reference to FIG. 2, chute conduit 231 is provided with holes (234 for 231) for dropping particles for the inner adsorbent layer into the vessel. A divider plate 232 marks the distal end of chute conduit 231 and the limit of the deposition of the inner adsorbent layer by preventing flow of the inner adsorbent from holes 303 of lower portion 302 of chute conduit 233. The size and distribution of holes 234 and 303 is as described in the U.S. Pat. No. 5,324,159 with more and bigger holes towards the distal end of the rotary arm so as to maintain the volumetric flow rate the same throughout each layer and all layers.

The adsorbent that is to form the inner layer is loaded on hopper 204, let through conduit 210 and split between the rotary arms 230 and 230', traveling in chute conduit 231 of rotary arm 230 and falling through holes 234 to the predetermined radial location of the adsorbent bed and at a predetermined radial thickness. Simultaneously, the outer adsorbent is discharged through holes 303 as will be described below.

Returning to FIG. 2, the outer hopper assembly 203, through which the outer adsorbent layer is loaded onto a vessel, surrounds and is substantially concentric with the inner hopper assembly 202. Outer wall 205 of outer hopper assembly 203 is constructed below inner hopper shelf portion 206 and around wall 204. At its upper end, wall 205 flares outwardly to form funnel 207 which is used to receive the outer adsorbent from a drum, 244, through nozzle 209. Funnel 207 is fitted with a flexible protective skirt 211 in the shape of a truncated cone. Skirt 211 can be made of any water vapor impermeable material (such as rubber) and serves to avoid contact between ambient water vapor and the dry adsorbent. Skirt 211 is sufficiently large and ample to ride up over the drum nozzle 209 and thus to provide adequate protection against contact with water vapor.

The outer adsorbent is loaded onto funnel 207 as funnel 207 rotates (along with the entire loader 201) around the central axis. Nozzle 209 is fixed, at least while particles are being loaded onto the outer hopper assembly 203, and does not rotate.

Nozzle 209 is provided with gate valve 215 for controlling the outer adsorbent flow. (The inner adsorbent particles can be loaded from a drum using the same type of gate valve and nozzle arrangement.) The outer adsorbent enters funnel 207 then flows down the annular cylinder 217 formed between wall 205, inner hopper shelf 206 and wall 204. A feed cone, 219 concentric with feed cone 208 is provided at the bottom of wall 205 and provides a smooth reduction of the cross-sectional area within which the outer adsorbent can flow between annular cylinder 217 and annular conduit 221, concentric with and surrounding conduit 210. Conduit 221 is formed between outer cylindrical wall 223 and cylindrical wall 212 of conduit 210. Conduit 221 leads the outer adsorbent onto chute conduit 233 of rotary arm 230. An inverted V plate 235 is fitted within conduit 221 for dividing the outer adsorbent flow equally between conduit 233 rotary arm 230 and its counterpart, conduit 233' of rotary arm 230. Each face of plate 235 has a hole 235a through which the outer adsorbent passes into conduit 233 (and 233')

Rotary arms 230 and 230' are fixed onto wall 223 and are integral with the entire assembly 201. The outer adsorbent flows into conduit 233 of arm 230 and within conduit 233 radially outwardly towards the distal end 301 (in FIG. 3) of rotary arm 230. When the outer adsorbent reaches past plate 232, it falls to lower distal portion 302 of conduit 233 through the holes 303 to the vessel below, depositing the outer adsorbent layer at a predetermined radial location, and in a predetermined radial thickness.

The flow of the particles is controlled by the size, number and spacing of holes such as 234 and 303 (FIG. 3) as well as by the gate valve(s), relative size of the hoppers and feed cones and rotation speed. With respect to the rotation speed, the present invention differs from U.S. Pat. No. 5,324,159. In both instances, at higher rotation speeds the tangential component of the particle velocity pushes the particles radially outwards towards the wall of the adsorbent bed. If only a single adsorbent or only one adsorbent mixture is being deposited, as described in the foregoing patent, any adverse effect results merely from adsorbent particles being pushed against the bed peripheral wall. When more than one layer of different adsorbents are employed, however, the interface between layers will be displaced radially outwards at higher speeds (and the mixing zone at the interface will also increase). Displacement of the interface will change the relative depth of the two layers and will also result in uneven packing density.

On the other hand, it is important to maintain rotation speeds sufficiently high not only in order to fill the vessel quickly but also in order to obtain an increased density advantage.

Accordingly, the rotation speed should be optimized for each adsorbent bed size, number of layers, granulometry and composition of each layer, and the sharpness of the interface between layers that is required. The present inventors have found that a useful guideline is that, preferably, the rotation speed of the rotating arm should be within the range of about 2 to about 10 rpm, although lower rotational speeds may be considered for situations wherein there are multiple rotation arms. The optimum rotary speed can be found by experiment or simulation as is common in this art. The first speed to try should be 4 rpm. Radial displacement of the interface is a polynomial function of the rotational speed of the arm and is also a polynomial function of the radius of the rotary arm at the point corresponding to the interface (and, in turn, the arm radius depends on bed radius). For a drop height of about 2 ft. or more and a rotation speed of about 4 rpm, the radially outward movement of the particles may not be a strong function of drop height because this movement may be countered by air drag. It should be noted that for higher rotational speeds, the radial displacement of the particulate material increases with an increase in drop height. It is expected that particle granulometry configuration and weight will contribute to the determination of the optimum rotation speed, and this is why some routine experimentation or simulation is recommended.

If it is desired to increase the vessel filling speed, the holes of the chute conduits can be made larger. Again, the holes distribution is important in maintaining a constant volumetric flow rate within an adsorbent layer and across all layers. Larger diameter holes on the chute conduit may permit a slight increase in the rotation speed.

As a result of flowing in separate streams through the aforedescribed assembly 201, the particles of the inner and outer adsorbents are kept separate and are discharged from the rotary arm at different radial locations of the adsorbent bed 2 of vessel 1 (FIG. 1), creating two distinct concentric layers of adsorbent each layer radially disposed within the adsorbent bed 2 and having a predetermined height and radial thickness and contacting the adjacent layer at an interface that is free of free-standing structural elements.

The volumetric rate of flow of each adsorbent is maintained the same by controlling the flow rate of the particles of one adsorbent vis a vis flow rate of the other adsorbent. A high and uniform packing density is achieved in each adsorbent layer, and the layers are deposited simultaneously. The result is a higher packing density than when entire loads of particles are discharged into an adsorbent bed section of a vessel (as was done in the prior art where structural partitions were used to divide layers). Theoretically, it is possible to fill the radial layers manually by alternating between deposition of a very thin horizontal layer of each adsorbent. Depending on the thickness of each horizontal layer, the interface may not be sharply defined. However, the filling speed will be very slow, the process will be excessively labor-intensive and the resulting packing density not higher than the prior art discussed in the introductory portion of this specification.)

The sharpness of the interface between the two concentric layers depends on whether any mixing occurs between the particles of the inner layer and the particles of the outer layer. Upon hitting the surface of the adsorbent bed, some of the particulate material will bounce from the bed surface, some will be driven deeper into the bed surface and some will cause other particles in the bed to move. Since the bed surface is not smooth but is made of particles, the subsequently falling particles that do rebound (or are "pushed" and caused to move) do so at random angles, including angles that will cause some of them to cross an imaginary cylindrical surface extending from plate 232 and corresponding to an ideal interface 9. The particles that cross this ideal interface thus end up within the other layer, and some particle mixing occurs. The fewer particles cross over, the less mixing will occur and the sharper (i.e. narrower) the interface between adjacent adsorbent layers will be. Therefore, in order to maintain a sharp interface, the number of bouncing or moving particles, and the distance that they will travel after striking the bed surface or being moved by another falling particle should be minimized. Alternatively, or additionally, the direction of such movement should be controlled.

The distance traveled by a bouncing or a "pushed" particle and the number of bouncing or pushed particles is a function of the particle energy upon striking the bed which in turn is a function of the height from which the particles fall (assuming they have not reached terminal velocity). This height is the distance between the holes of the rotary arm and the bed surface (i.e. base 5 in FIG. 1 prior to any filling and top 6 of adsorbent bed thereafter).

The foregoing assumption that the particles do not reach terminal velocity holds for most adsorbents and most vessel sizes in VPSA. In any event, the falling distance at which terminal velocity is reached can be calculated as is well-known in the art from particle drag coefficient, particle diameter, particle density and density of the fluid medium (usually dry $N_2$) through which the particles fall. The validity of the assumption can thus be determined for each particular case. If the height between the holes and the bed surface is so great that substantial mixing will occur, then measures can and should be taken to sharpen the interface. On the other hand, a minimum drop height is required to impart the energy necessary to drive the particles onto the bed to achieve the desired high packing density. Factors affecting the uniformity and density of the particulate materials include drop height, number of rotating arms, particulate flow rate and the speed of arm rotation. How much mixing at the interface can be tolerated depends on the particular application. In VPSA, how much mixing can be tolerated depends on various parameters, such as the types of gases to be separated; (i.e. the interface needs to be sharp between a water vapor removing layer and a nitrogen-retaining layer as in VPSA adsorption cycle) or the relative thickness of the adjoining adsorbent layers (if an adsorbent layer is very thin, as is often the case with the outer adsorbent layer, mixing should be reduced so as not to adversely affect performance of the outer layer). These parameters can be assessed by those of ordinary skill in the art in light of the present disclosure using no more than routine knowledge and at most routine experimentation.

In an experiment involving two different colored 13× zeolite particles 8×12 mesh falling through still air at ambient conditions, terminal velocity would be reached at 40 ft. of free fall, which is possible only in the largest vessels. The adsorbent particles of the same color were placed in one of two compartments of a divided container and allowed to fall a fixed height through a series of equally spaced holes in the bottom of the container. After a free fall of 6 feet involving the same particles in a situation simulating vessel filling, 90% of the mixing between layers occurred within a zone of 1.5–2.0 inches straddling the ideal interface. Such a 2-inch mixing zone would be acceptable for most applications, while for some VPSA applications it may be preferred to confine the 90% mixing zone to a width of no more than 0.25–0.5 inch.

If the free fall height in the simulation using the same particles were increased to 10 feet, the particle kinetic energy would increase by 56% and the particles would reach 77% of their terminal velocity on impact. The width of the 90% mixing zone would increase to 3–4 inches. A 4-inch mixing zone could be acceptable for some applications, especially those involving deeper beds, i.e. for beds in which each adsorbent layer has a depth of 2 feet or more. However, for beds in which one or more layers have a depth of 6 inches or less, a 4-inch mixing zone would probably not be acceptable.

The present invention includes several methods and devices depicted in FIG. 6 (6A–6E) for maintaining a sharp interface even when the falling distance is so large that the terminal velocity is reached before impact or more generally when the particle kinetic energy conditions are adverse for a particular vessel and application.

1. A partition 601 in FIG. 6A extending from the rotary arm at a point lying directly above the desired interface (i.e. at plate 232 in FIG. 2 and above interface 9 in FIG. 1). The partition 601 is preferably a plate having suitable dimensions such as 3×6 inches. Partition 601 can be integral with the rotary arm 230 (or 231') or suspended therefrom. The height of partition 601 need not be greater than 1 foot, and can be as small as 3 in. Larger sizes are acceptable but unnecessary. The partition restricts the material from spreading into a cone as it comes out of the holes (e.g. 303 or 234 in FIG. 3) in the rotary arm and reduces mixing of the two adsorbents during the free particle fall from the rotary arm to the bed surface.

2. Retractable partition 602 in FIG. 6B extends from the rotary arm above the desired interface as in FIG. 6 to just above the surface of the adsorbent bed. As the bed is loaded the partition is progressively retracted. For example, the partition would be retracted in the same manner as a slotted Venetian Blind or rolled up from its top or bottom as a window shade, as depicted in FIGS. 7A and 7B. Preferred partition dimensions are 6–12 in. Partition 601 can be used in conjunction with partition 602.

3. A partition 603 in FIG. 6C would be suspended at a height from just above the top of the bed to 1 foot above the bed. The partition 603 is held from the rotary arm by wires 604. The partition 603 rotates with the rotary arm and can be moved upward by retracting the wires as the bed is being filled.

4. A cylindrical partition 605 shown in FIG. 6D in axial cross-section is not connected to the rotary arm 230 but extends a short way into and above the bed. The bed is then filled in multiple steps. After each filling step (which adds to the adsorbent bed sufficient height as to almost "bury" the partition 605), partition 605 is pulled up but is not completely pulled out of the bed. Filling is then resumed. When filling is completed (or when the height of the bed makes the drop height short enough for mixing not to be a problem) the partition 605 can be removed and is not a permanent element of a filled vessel (unlike the prior art).

Figure 6A:
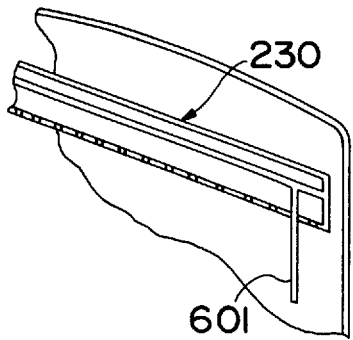
FIGS. 6A–6E depict schematic views of a series of partition devices that can be employed in conjunction with a particle loader according to the invention, each device serving to reduce mixing of two types of adsorbents at the interface between two layers.
Figure 6B:
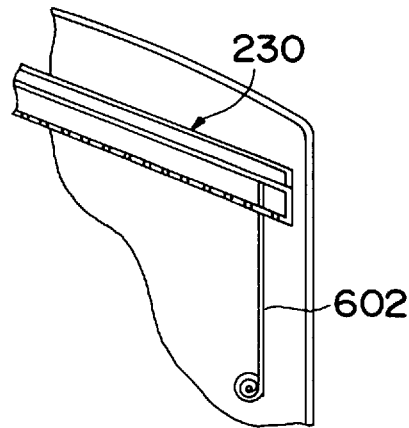
Figure 6C:
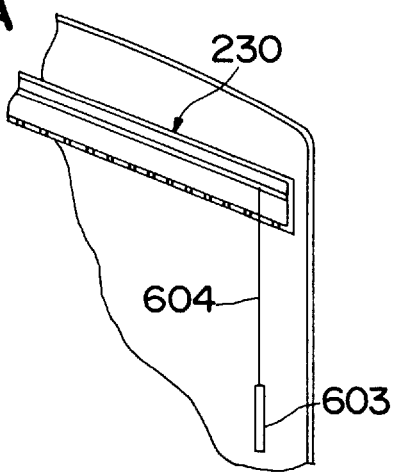
Figure 6D:
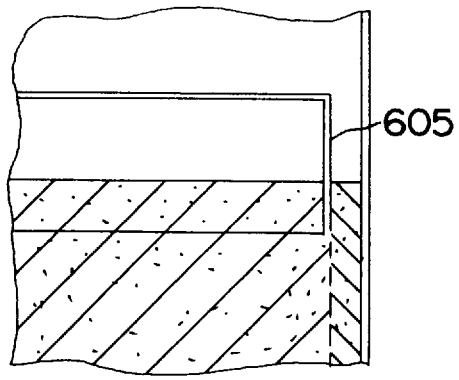
Figure 6E:
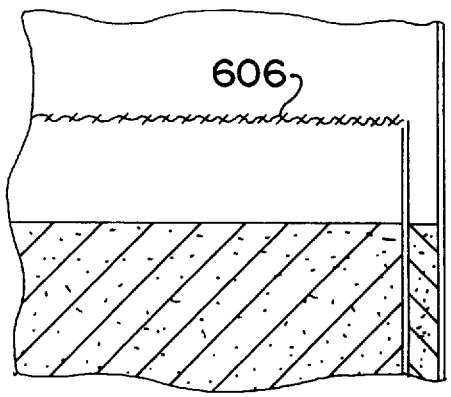

5. A cylindrical screen partition 606 in FIG. 6E is provided and remains in the bed after filling. The partition can but need not extend the entire height of the adsorbent bed since the mixing zone width usually needs to be controlled only towards the bottom of the bed where the particles have to fall a greater distance. Since the adsorbent bed layers on both sides of the screen are filled simultaneously, the screen need not be free-standing and is not a structural member such as would substantially increase the cost of the vessel. In fact, partition 606 need not support its own weight when the vessel is empty but can be suspended from above (not shown).

6. A loader arm assembly (not shown) can also be used. The loader arm assembly in effect lowers the particle dispensing operation some distance into the vessel, thereby redirecting the free fall height of particles. The loader arm assembly has two or more separate compartments extending downward from the rotary arm, one for each type of adsorbent. Each compartment is in particle stream communication with the corresponding conduit of the rotary arm and serves to dispense one type of adsorbent. The loader arm assembly extends into the bed and limits the drop height of the particles to an acceptable value to ensure desired particulate packing density. Once the bed is filled to the bottom of the loader arm assembly, the loading could be stopped and the assembly repositioned higher, or the assembly could be retracted or disassembled and shortened and then the particle loading would resume. Alternatively, the assembly could be designed such that the arm is raised at a speed such that the drop height of the particles remains constant.

In still another alternative, when circumstances require that the loader position is fixed, parameters including flow rate and rotational speed may be adjusted as the bed fills (and the drop height decreases) so as to ensure desired packing density and minimize interface mixing.

The selection of modifications such as the above is within the skill of the art.

Figure 5:
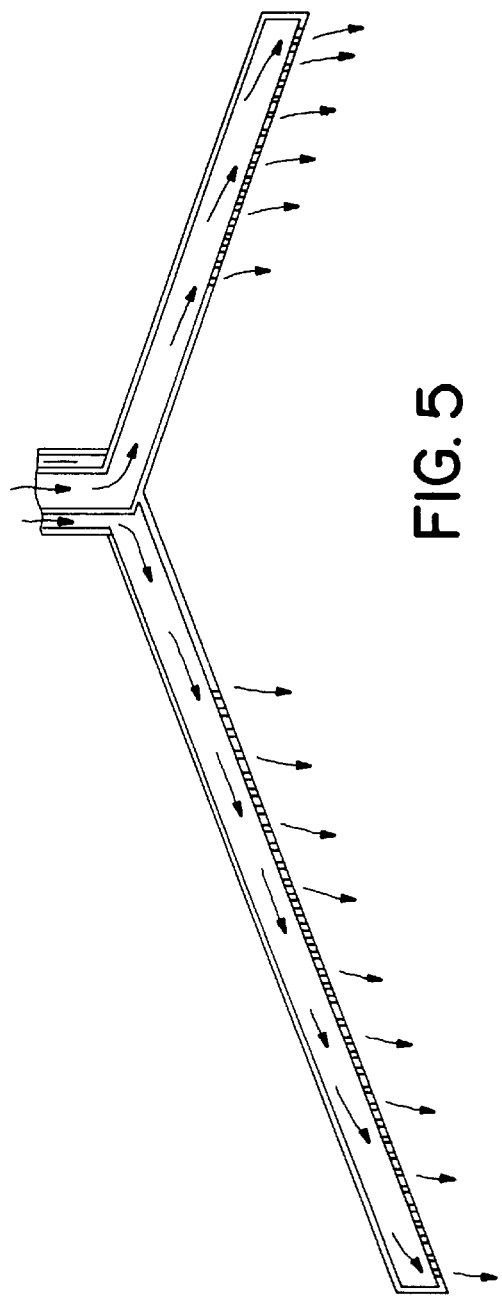
FIG. 5 depicts a detailed axial cross-sectional view of another embodiment of a dual rotary arm, one employing one rotary arm to deposit a first adsorbent layer and the other rotary arm to deposit another adsorbent layer.

Many variations on the above-described embodiments are contemplated including for example the following:

Each arm of the dual rotary arm dispenses only one type of adsorbent. This is shown in FIG. 5. Shorter rotary arm 530 dispenses the inner adsorbent. Longer rotary arm 531 dispenses the outer adsorbent out of chute conduit 532.

Figure 4A:
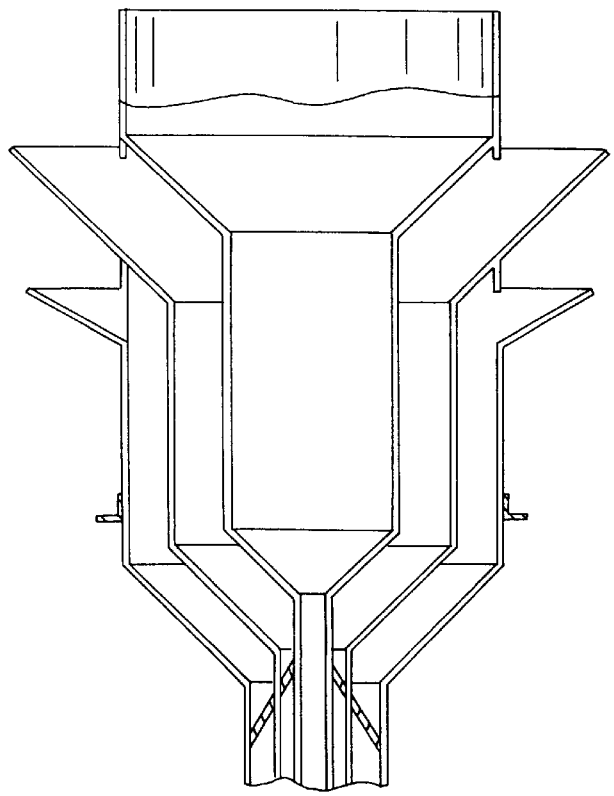
FIGS. 4A and 4B depict an axial cross-sectional view of another particle loader embodiment, one dispensing three types of adsorbent, each in a separate radially disposed layer.
Figure 4B:
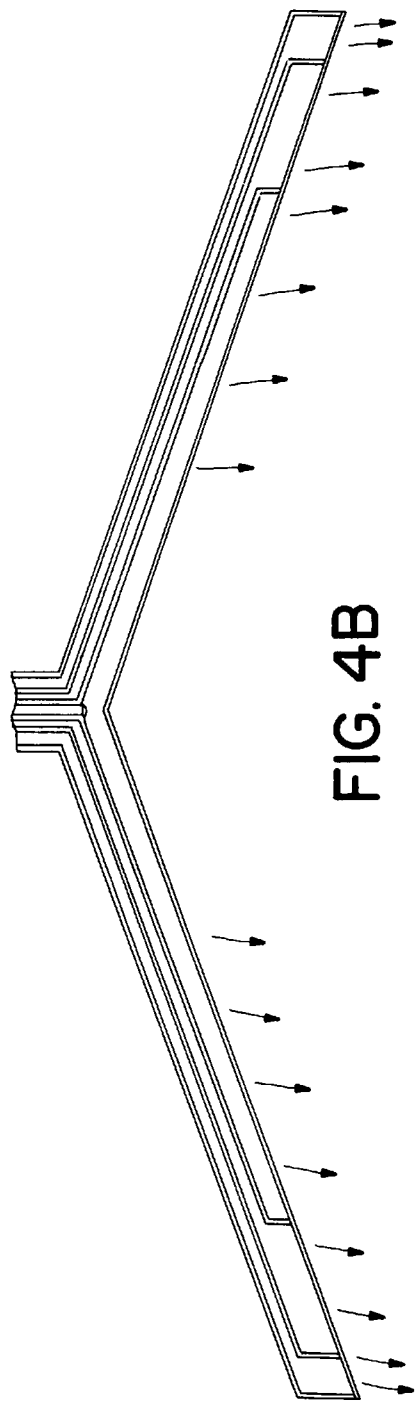

More than two different types of adsorbent or other materials (differing in composition or granulometry of particles or being one or more combinations of particles of different composition and/or granulometry) can be deposited in successive vertical radially disposed concentric layers. This is illustrated in FIGS. 4A and 4B for three adsorbents and is accomplished by providing one or more additional hopper assemblies 203 and 401 surrounding and concentric to hopper assembly 202.

Assembly 401 comprises the same elements as assembly 203 described above. The rotary arm(s) 430 (430') comprises three separate chute conduits 431, 433 and 435 each dispensing one type of adsorbent to create a layer at a predetermined radial location within the bed, the layer being of predetermined radial depth.

Another modification of the present invention provides for mixing of adsorbents, i.e. deliberately creating one or more vertical layers of an adsorbent wherein the layer contains a mixture of at least two particulate materials of differing composition and/or granulometry and/or adsorption properties. In this modification the two rotary arms are of the same length. Each rotary arm is in particle flow communication with a hopper which contains a different adsorbent. Each rotating arm dispenses one type of adsorbent creating in one rotation a thin layer of particles, followed closely by the dispersing of another thin layer of particles by the other rotating arm. Because the particles have considerable kinetic energy, considerable mixing occurs and the layers are not stratified. The flow rate of each material can be controlled by the size and number of holes in each of the chute conduits so that the desired quantity of each material is included in the mixture. It has been found that after the particles fall, hit the bed surface and come to rest, the resulting particle distribution is mixed on the order of the particle diameter.

Alternatively, the materials could be premixed in the desired proportions below the loading funnels by controlling the exit area of these funnels. Further mixing would occur during the drop from the holes and on impact as described. Adapting the apparatus and method of the invention to creating adsorbent mixtures avoids having to premix the particles and helps avoid breakage and contamination.

The speed of rotation needs to be taken into account and maintained within a low range, as described above, so that the particles falling from the holes of the chute conduit will not have an excessive radial motion component which would result in a deposition of uneven layers, to excessive mixing at the interface and to radial outward displacement of the interface, discussed above.

As suggested above, the invention is not limited to adsorbent materials. Rather, the loader may be used in conjunction with any particulate materials having, for example, different compositions and/or granulometry.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A particle loader assembly for loading particles into a vessel to form a particle bed comprising inner and outer radially disposed concentric layers of particles said inner layer containing at least one type of particle of different granulometry or composition or both granulometry and composition from a type of particle contained in said outer layer, the assembly comprising:

first feed hopper means for supplying particles for the inner layer;

second feed hopper means for supplying particles for the outer layer;

at least one rotary arm having a first end proximal to said feed hopper and a second end distal to said hopper and comprising:

(i) a first chute conduit in particle flow communication with said first feed hopper and adapted for dispensing at an uniform flow rate particles supplied by said first feed hopper and forming said inner layer upon rotation of said at least one arm; and (ii) a second chute conduit in particle flow communication with said second feed hopper and adapted at the distal end thereof for dispensing at said uniform flow rate particles supplied by said second feed hopper and forming said inner layer upon rotation of said rotary at least one rotary arm whereby said inner and outer layers contact one another at an interface;

drive means for rotating said hopper means and said at least one rotary arm, the rotation of the hopper means facilitating the uniform distribution of particles within said flow of particles through said assembly;

control means for controlling the feed and rotation rate of said assembly.

2. The assembly of claim 1 comprising a dual rotary arm.

3. The assembly of claim 1 further comprising a first connecting conduit establishing particle flow communication between the first chute conduit of said at least one rotary arm and said first feed hopper means.

4. The assembly of claim 3 further comprising a second connecting conduit surrounding said first connecting conduit and concentric therewith said second connecting conduit establishing particle flow communication between said second feed hopper means and said second chute conduit of said at least one rotary arm.

5. The assembly of claim 4 comprising a dual rotary arm having two rotary arms diametrically opposed, said second connecting conduit fitted with particle flow splitting means for dividing the flow of particles for said outer adsorbent into two equal portions, each directed into a different one of the two rotary arms.

6. The assembly of claim 1 wherein the first chute conduit of said at least one rotary arm is integral with said second chute conduit of said at least one rotary arm.

7. The assembly of claim 1 further comprising at least one additional feed hopper means interposed between said first and second hopper means for supplying particles for at least one intermediate layer of particles disposed within said particle bed between said outer layer and said inner layer, and at least one additional chute conduit associated with and in particle flow communication with said at least one additional feed hopper means and adapted for dispensing at said uniform flow rate particles supplied by said at least one additional feed hopper and forming said at least one intermediate layer upon rotation of said at least one rotary arm.

8. The assembly of claim 7 wherein each of said first, second and at least one additional chute conduits is integral with said at least one rotary arm.

9. The assembly of claim 1 comprising a dual rotary are comprising two rotary arms wherein the first rotary arm comprises said first chute conduit and the second rotary arm comprises the second chute conduit.

10. The assembly of claim 1 further comprising means suspended from said assembly for reducing the radial width of a particle mixing zone at the interface between said inner and outer layers said radial width reducing means configured to curb bounding or pushed particles without contacting either said outer and inner layers of said vessel.

11. A particle loader assembly for loading particles into a vessel to form a particle bed comprising at least one layer of particles, said layer containing at least two type of particles of a first and second type differing from one another in at least one of granulometry and composition, the assembly comprising first feed hopper means for supplying particles of the first type;

second feed hopper means for supplying particles of the second type;

at least one rotary arm having a first end proximal to said feed hopper and a second end distal to said hopper and comprising:

(i) a first chute conduit in particle flow communication with said first feed hopper and adapted for dispensing in a dispensing zone at first uniform flow rate particles of the first type supplied by said first feed hopper;

(ii) a second chute conduit in particle flow communication with said second feed hopper and adapted for dispensing in said dispensing zone at a second uniform flow rate particles of the second type supplied by said second feed hopper whereby upon dispensation a mixed particle layer results;

drive means for rotating said hopper means and said rotary arm, the rotation of the hopper means facilitating the uniform distribution of particles within said flow of particles through said assembly;

control means for controlling the rotation rate of said assembly.

* * * * *